Figure 1:
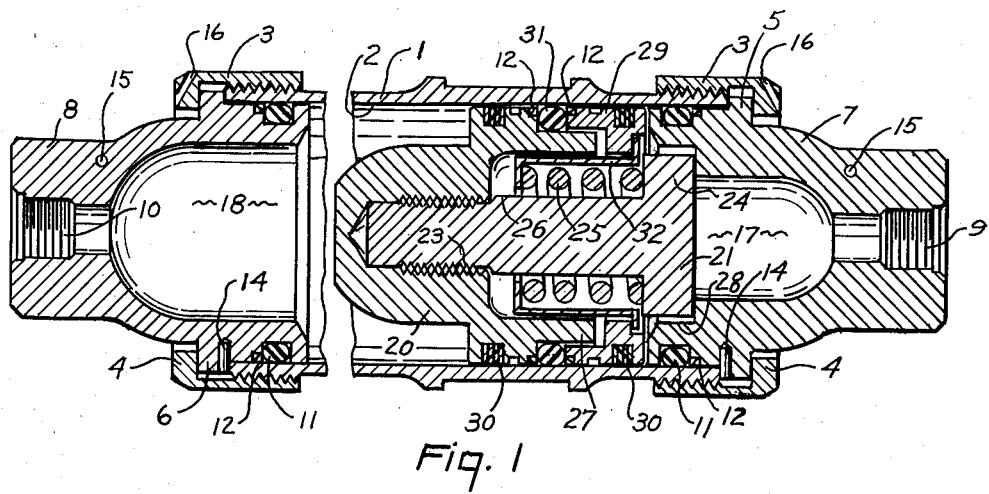

March 14, 1961 P. H. KAHELIN 2,974,683
ACCUMULATOR AND PISTON THEREFOR
Filed Feb. 7, 1958

INVENTOR.
PAUL H. KAHELIN
BY
Oberlin & Limbach
ATT'YS

United States Patent Office 2,974,683
Patented Mar. 14, 1961

2,974,683
ACCUMULATOR AND PISTON THEREFOR

Paul H. Kahelin, El Cajon, Calif., assignor to Parker-Hannifin Corporation, Cleveland, Ohio, a corporation of Ohio Filed Feb. 7, 1958, Ser. No. 713,832

3 Claims. (Cl. 138—31)

The present invention relates generally as indicated to an accumulator and piston therefor and more particularly to a hydro-pneumatic type of accumulator characterized in the provision of a cylinder having a piston reciprocably mounted therewithin, said piston serving to sub-divide the chamber within the cylinder and its end caps into two separate, non-communicating chambers, one of which is charged with gas under pressure, usually air, and the other of which is connected into a fluid pressure system such as a hydraulic system. Thus the air compartment containing air under pressure serves constantly to exert force on one side of the piston which, in turn, tends to expel under pressure the oil or other fluid disposed on the opposite side of the piston. In this way when a valve in the hydraulic system is operated to effect operation of a fluid motor or like device which results in flow of oil in the system, the accumulator will serve to minimize the pressure drop in the system caused by such operation. The accumulator serves also as a reservoir for high pressure oil and as a shock absorber due to the air cushion.

In most hydraulic systems the presence of gas or air bubbles in the hydraulic fluid cannot be tolerated since the operation of the various delicate valves and pumps, fluid motors, etc. may cause malfunctioning thereof and may cause shock, cavitation, etc. Accordingly, it is of utmost importance to eliminate leakage between the air and liquid compartments of the accumulator.

Also, certain rigid specifications must be met with reference to performance characteristics of accumulators as used, for instance, in the hydraulic systems of aircraft, this including not only volumetric efficiency but as well mechanical efficiency. In other words, in some installations it is required to provide a 95% volumetric efficiency so that the trapped oil volume in the accumulator is not greater than 5%. Likewise there are varied requirements as to the compression ratio of the accumulator as the piston therein is moved from one end position to the other. With reference to mechanical efficiency the piston packings, aside from providing a leak proof joint between the piston and the accumulator cylinder, must have a relatively low friction with the wall of the cylinder. Furthermore, since accumulators may be subjected to wide variations in fluid and/or ambient temperatures, the piston packing must be arranged to provide a leak proof sliding joint at very low temperatures at which the packing ring is apt to shrink, and by the same token, the piston packing must be arranged to prevent undue increase in friction at the higher temperatures at which the packing ring is apt to swell or expand or when contacted by certain fluids that may cause such swelling.

Accordingly, it is a principal object of this invention to provide an accumulator and piston therefor which is characterized by its superior properties which fulfill the foregoing requirements with reference to volumetric efficiency, mechanical efficiency and prevention of leakage past the piston packing from the air chamber to the liquid chamber and vice versa.

It is another object of this invention to provide an accumulator and piston therefor in which the piston assembly carries a rubber or rubberlike packing ring that is at all times uniformly spring loaded to ensure fluid-tight contact thereof between the cylinder wall and the bottom wall of the piston groove.

It is still another object of this invention to provide an accumulator and piston therefor in which the packing ring of rubber or rubberlike material is contained in a packing groove of the piston and is retained therein by endless back-up rings which prevent extrusion of the packing ring even under conditions of extreme pressures of the air or liquid on opposite sides of the piston.

It is yet another object of this invention to provide an accumulator piston which is supported for low friction sliding, against cocking, and out of metal-to-metal contact with the smoothly finished cylinder wall by means of non-metal, low friction guide rings.

It is another object of this invention to provide a multi-part piston for an accumulator in which the spring employed for spring loading the piston packing is disposed concentrically inside said packing, thereby shortening the piston considerably as compared with the usual arrangement in which the packing, the packing follower, the spring, and the spring abutment are serially arranged axially of the piston.

It is another object of this invention to provide a piston for accumulators in which uniform axial spring loading of a resilient packing ring is achieved through guided packing and spring followers.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 2:
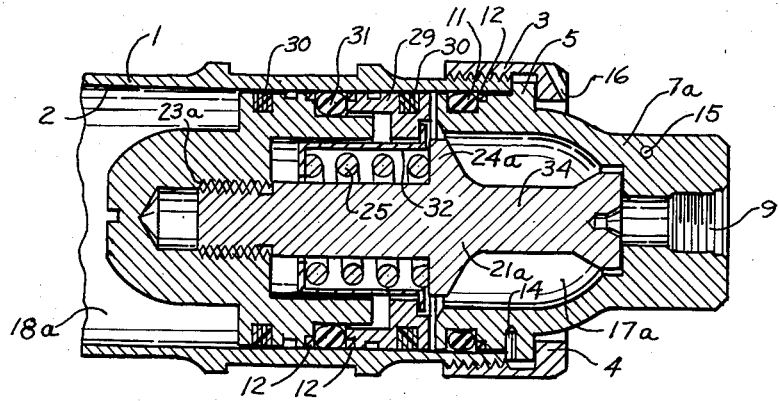

In said annexed drawing:

Fig. 1 is a central longitudinal cross-section view of an accumulator embodying the present invention; and Fig. 2 is a fragmentary longitudinal cross-section view of an accumulator having a piston therein of somewhat different form than that shown in Fig. 1.

Referring now in detail to the drawing and first to Fig. 1 thereof the accumulator herein shown comprises a thin wall cylinder or shell 1 which is formed with a smoothly finished bore 2 therethrough. The ends of the cylinder 1 are externally threaded as shown and screwed thereon are the nuts 3 which have inturned flanges 4 for clamping the respective collars 5 and 6 of the end caps 7 and 8 in direct abutting contact with the respective ends of the cylinder 1.

The end cap 7 is provided with a threaded port 9 for connection with an air supply source, a gas check valve (not shown) usually being connected to port 9 so that the chamber in the right hand end of the cylinder 1 may be charged with gas under pressure. The other end cap 8 is provided with a threaded port 10 for connection as by tubing into a fluid pressure system.

Each end cap 7 and 8 adjacent its inner end is formed with a peripheral groove to accommodate an O-ring 11 of rubber or rubberlike material, the groove additionally being formed with a shoulder or step on which is placed an endless, non-metallic ring 12 as of poly tetrafluoroethylene (better known as "Teflon"), said ring being of diameter substantially equal to the diameter of the bore 2 so as to eliminate gaps into which the O-ring 11 might be extruded or worked under the influence of high air or oil pressure as the case may be.

In order to lock the end caps 7 and 8 against rotation with respect to the cylinder 1, each end cap 7 and 8 has a radially extending pin 14 fitted into a drilled hole therein with the side of the pin 14 engaged in a complemental notch formed in each end of the cylinder 1. Now, in order to lock the nuts 3 against loosening wires are inserted through holes 15 and 16 of the respective end caps 7 and 8 and nuts 3 and twisted in known manner. By such expedient it is not necessary to make provision for wire locking of the nuts 3 directly to the cylinder 1 and therefore the cylinder wall may be kept as thin as possible in the interest of weight reduction.

The end caps 7 and 8 are of generally dome-shaped design as shown to most effectively resist distortion or failure due to high internal pressures. Even the collar design of said end caps 7 and 8 is such as to obviate the possibility of shear failure.

In practice, especially for aircraft hydraulic systems, the accumulator cylinder 1 will usually be made of strong metal such as corrosion resisting steel and by reason of its great strength its wall may be relatively thin to effect weight reduction.

As evident from the drawing, the piston assembly which is axially reciprocably mounted in the cylinder constitutes a movable partition to form in the cylinder 1 two separate chambers or compartments 17 and 18 and in the case of hydropneumatic accumulators the chamber 17 at the right is a gas pressure chamber and the chamber 18 at the left is a hydraulic oil chamber.

Basically, the piston assembly comprises a hollow piston head 20 which is shaped at its oil chamber end so as to be generally complementary with the cavity in the end cap 8, thus minimizing the volume of trapped oil in the accumulator when the piston assembly has moved to its extreme left position as viewed in Fig. 1. The piston head 20 is usually made of lightweight metal such as aluminum or aluminum alloy. Screwed into the air chamber side of the piston head 20 is a stop member 21 which, likewise in the interests of weight reduction, is made of lightweight metal such as aluminum or aluminum alloy. In order to prevent seizing or galling at the threaded connection between the piston head 20 and the stop member 21, a steel insert 23 in the form of a closely coiled spring is screwed into the piston head 20 and in turn the stop member has threaded engagement with the insert 23, thereby eliminating need for using lubricants or anti-seize compounds which ultimately deteriorate or dry up and thereby render disassembly of the piston difficult or impossible.

The outer enlarged end 24 of the stop member 21 provides an abutment shoulder for a spring 25 which is disposed around the shank 26 of the member 21 and at least partially inside the skirt 27 of the hollow piston head 20. The enlarged end 24 is arranged to abut the bottom of the counterbore 28 in the end cap 7. When it is required to provide an air chamber 17 of minimum volume less than shown in Fig. 1, it is a simple matter to form the stop member 21 with a stem or projection extending into the recess in the end of the end cap 7.

A packing follower 29 constitutes a part of the piston assembly, said packing follower 29 and the piston head 20 each being formed with a peripheral groove in which guide rings 30 of plastic or like material are disposed, the plastic material being selected to have requisite strength and hardness as well as a low coefficient of friction with the bore 2 of the cylinder 1. Tetrafluoroethylene has been found well suited for this purpose, especially from the standpoint of low friction, and in the instant embodiment each groove has therein two strips of this material, each comprising two convolutions. Guide rings 30 thus wound from strip material are expansible in diameter for ease of assembly on the grooves of the respective parts 20 and 29. These guide rings 30 prevent metal-to-metal contact of the piston assembly with the cylinder bore 2 and because they are relatively widely spaced apart they serve to stabilize the piston assembly from cocking within the cylinder 1.

The skirt 27 of the piston head 20 has an exterior stepped formation over which a portion of the packing follower 29 is telescoped, the axially opposed faces of the step of the skirt 27 and of the end of the packing follower constituting the end walls of an annular packing groove in which an O-ring or like resilient packing ring 31 is disposed and normally radially squeezed between the cylinder bore 2 and the bottom of the groove formed by skirt 27. The stepped formations on the end walls of the packing chamber for O-ring 31 carry endless back-up rings 12 identical with those previously described, said back-up rings preventing extrusion of the O-ring 31 even under the influence of extremely high pressure in the air and liquid chambers 17 and 18.

The outer end of the packing follower 29 is counterbored as shown for engagement by the out-turned flange of a guide sleeve or spring follower 32 which is telescoped within the skirt 27 of the piston head 20 and which is provided, at its inner end, with an inturned flange which is spaced axially from the spring abutment shoulder of the stop member 21. Compressed between the inturned flange of said guide sleeve 32 and said abutment shoulder is the coil spring 25 which constantly tends to urge the guide sleeve 32 and packing follower 29 toward the left as viewed in Fig. 1 so as to axially squeeze the O-ring 31 in sealed contact with the cylinder bore 2 and with the bottom of the packing groove despite shrinkage or lack of fluid pressure to accomplish that purpose.

A characterizing feature of the present piston construction is that the stop member 21 which is rigidly connected to the piston head 20 functions as a piston stop by engagement with the end cap 7. The guide sleeve 32 axially clears the head 24 of the stop member 21 so that the O-ring 31 is axially squeezed by the pressure of the spring 25.

By reason of the foregoing construction, the loss of the air charge in chamber 17 and consequent rapid movement of the piston assembly toward the right to its stop position under the influence of fluid pressure in the oil chamber, does not result in imposition of any shock load on the packing follower 29 or on the O-ring 31 engaged thereby. A further and likewise important feature of the present invention is that the packing follower 29 will uniformly press against the O-ring 31 around the entire axially facing side because both the guide sleeve 32 and follower 29 are guided against cocking action which otherwise results from the use of the coil spring 25. Still another important feature is that in the event of loss of the air charge as aforesaid, the predominance of the liquid pressure on the O-ring 31 will not dislodge the same since only a limited amount of movement of the follower 29 away from the O-ring 31 is permitted as determined by the small axial clearance between the end of the guide sleeve 32 and the head 24 of the stop member 21. The last mentioned feature also prevents excessive compression of the spring 25.

The structure illustrated in Fig. 2 is substantially the same as that just described and, therefore, the same reference numerals or numerals with the subscript letter "a" have been employed to designate the same or equivalent parts to thereby eliminate the need for repeating the structure and operation of the Fig. 2 accumulator. Essentially the only difference between Figs. 1 and 2 is the shape of the end cap 7a and the provision of a stem 34 on the stop member 21a. Moreover, in Fig. 2 it is the end of the stem 34 that constitutes the stop for the piston movement toward the end cap 7a instead of the spring abutment head 24 in Fig. 1. Obviously, the diameter of the stem 34 may be selected to determine the smallest size of the air chamber 17a as may be required by applicable specifications.

It can be seen that should the O-ring 31 shrink, the axial pressure of the follower 29 thereon will tend to increase the radial size of the O-ring 31 to maintain sealed contact with the packing groove and with the cylinder bore 2. On the other hand should the O-ring 31 swell, the packing follower 29 is capable of receding against the spring pressure to prevent development of excessive friction between the O-ring 31 and the cylinder bore 2. Another consideration is that in the event that fluid pressure is not available to exert a radial expansion of the O-ring 31 for sealing against the bore 2, the spring 25 will constantly supply an axial squeezing force on the O-ring 31 to maintain the seal with bore 2.

Other modes of applying the principle of the invention may be employed, change being made as regards the details described, provided the features stated in any of the following claims, or the equivalent of such, be employed.

I therefore particularly point out and distinctly claim as my invention:

1. A hydropneumatic accumulator comprising a cylinder having ported end caps through which liquid is adapted to flow into and from one end of said cylinder and through which the other end of said cylinder is adapted to be charged with gas under pressure; a piston having one end axially slidable in said cylinder responsive to differences in the liquid and gas pressures acting on opposite sides thereof; a resiliently deformable packing ring carried by said piston intermediate the ends thereof to make sliding sealed engagement with the bore of said cylinder and to coact with such one end of said piston to position said piston coaxially in said cylinder; a packing follower carried by said piston for axial sliding movement thereon toward one side of said packing ring and constituting, at the end thereof remote from such one end of said piston, the other end of said piston axially slidable in said cylinder; a spring disposed concentrically within said piston, said packing ring, and said packing follower and having one end bearing on a fixed shoulder formed on said piston adjacent such other end thereof; and a spring follower axially slidable in said piston and disposed concentrically within said piston, said packing ring, and said packing follower; said followers being formed with abutting surfaces adjacent such other end of said piston and the other end of said spring bearing on said spring follower whereby the expansive force of said spring is transmitted from said spring follower to said packing follower whereby the latter is moved toward said packing ring to exert axial force thereon tending to radially expand said packing ring to hold it in fluid-tight sealing engagement with the bore of said cylinder, one of said followers having a shoulder which is in close proximity to the fixed shoulder of said piston and which is adapted to abut the latter shoulder to limit to small amount the degree of movement of said packing follower in a direction away from said packing ring.

2. A hydropneumatic accumulator comprising a cylinder having ported end caps through which liquid is adapted to flow into and from one end of said cylinder and through which the other end of said cylinder is adapted to be charged with gas under pressure; a piston having one end axially slidable in said cylinder responsive to differences in the liquid and gas pressures acting on opposite sides thereof; a resiliently deformable packing ring carried by said piston intermediate the ends thereof to make sliding sealed engagement with the bore of said cylinder and to coact with such one end of said piston to position said piston coaxially in said cylinder; a packing follower carried by said piston for axial sliding movement thereon toward one side of said packing ring and constituting, at the end thereof remote from such one end of said piston, the other end of said piston axially slidable in said cylinder; a spring disposed concentrically within said piston, said packing ring, and said packing follower and having one end bearing on a fixed shoulder formed on said piston; and a spring follower axially slidable in said piston and disposed concentrically within said piston, said packing ring, and said packing follower; said followers being formed with abutting surfaces and the other end of said spring bearing on said spring follower whereby the expansive force of said spring is transmitted from said spring follower to said packing follower whereby the latter is moved toward said packing ring to exert axial force thereon tending to radially expand said packing ring to hold it in fluid-tight sealing engagement with the bore of said cylinder, said spring follower being in the form of a sleeve disposed about said spring and having an inturned flange at one end on which such other end of said spring bears and an outturned flange at the other end which abuts that end of the packing follower which is remote from the end that engages said packing ring, the outturned flange of said spring follower being in close proximity to the fixed shoulder of said piston and being adapted to abut the latter shoulder to limit to small amount the degree of movement of said packing follower in a direction away from said packing ring.

3. A hydropneumatic accumulator comprising a cylinder having ported end caps through which liquid is adapted to flow into and from one end of said cylinder and through which the other end of said cylinder is adapted to be charged with gas under pressure; a piston having one end axially slidable in said cylinder responsive to differences in the liquid and gas pressures acting on opposite sides thereof; a resiliently deformable packing ring carried by said piston intermediate the ends thereof to make sliding sealed engagement with the bore of said cylinder and to coact with such one end of said piston to position said piston coaxially in said cylinder; a packing follower carried by said piston for axial sliding movement thereon toward one side of said packing ring and constituting, at the end thereof remote from such one end of said piston, the other end of said piston axially slidable in said cylinder; a spring disposed concentrically within said piston, said packing ring, and said packing follower and having one end bearing on a fixed shoulder formed on said piston; and a spring follower axially slidable in said piston and disposed concentrically within said piston, said packing ring, and said packing follower; said followers being formed with abutting surfaces and the other end of said spring bearing on said spring follower whereby the expansive force of said spring is transmitted from said spring follower to said packing follower whereby the latter is moved toward said packing ring to exert axial force thereon tending to radially expand said packing ring to hold it in fluid-tight sealing engagement with the bore of said cylinder, said piston comprising a hollow head formed with a stepped axially extending skirt which provides one end wall and the bottom wall of a groove in which said packing is disposed, the opposite end wall of such groove being constituted by the adjacent end of said packing follower, and guide rings carried by said piston head and said packing follower effective, in conjunction with said packing ring to hold said piston out of contact with the cylinder bore and coaxial therewith, said guide rings having a low coefficient of friction with the cylinder bore and being axially spaced apart on opposite sides of said packing ring and at such one and other ends of said piston so as to guide the movements of said piston in said cylinder.

References Cited in the file of this patent

UNITED STATES PATENTS

| 912,502 | Squires | Feb. 16, 1909 |
|---|---|---|
| 2,724,412 | Gratzmuller | Nov. 22, 1955 |
| 2,780,504 | Russell | Feb. 5, 1957 |
| 2,809,080 | Mittell et al. | Oct. 8, 1957 |

FOREIGN PATENTS

| 1,137,483 | France | Jan. 14, 1957 |